April 16, 1968     W. H. WILKINSON ETAL     3,377,802
BEARING LUBRICATING SYSTEM FOR AN AIRCRAFT GAS TURBINE ENGINE
Filed Aug. 22, 1966     2 Sheets-Sheet 2

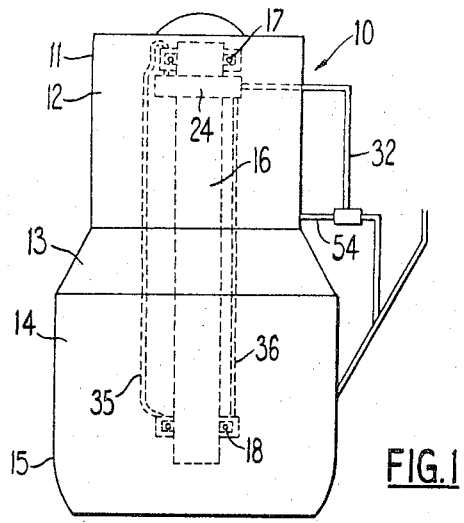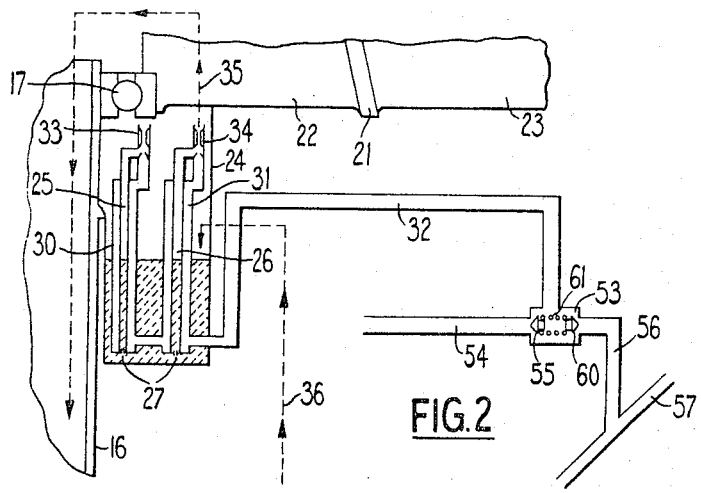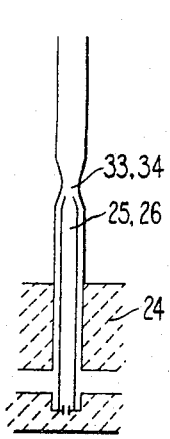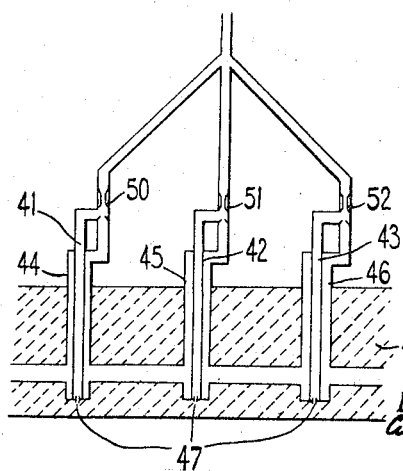

*INVENTORS*
*WILFRED HENRY WILKINSON*
BY *ARTHUR GEORGE GOSS*

Cushman, Darby & Cushman
ATTORNEYS

United States Patent Office 3,377,802
Patented Apr. 16, 1968

3,377,802
BEARING LUBRICATING SYSTEM FOR AN AIRCRAFT GAS TURBINE ENGINE
Wilfred Henry Wilkinson, Turnditch, Derby, and Arthur George Goss, Barrow-on-Trent, near Derby, England, assignors to Rolls-Royce Limited, Derby, England, a British company
Filed Aug. 22, 1966, Ser. No. 574,232
Claims priority, application Great Britain, Sept. 6, 1965, 38,066/65
4 Claims. (Cl. 60—224)

ABSTRACT OF THE DISCLOSURE

An aircraft power plant having forward propulsion jet engines and at least one lift engine having a recirculatory bearing lubrication system. The lubrication system passes lubricant and compressed air in heat exchange relationship through a venturi to induce a flow of air/lubricant mixture to the bearing. The initial air supply comes from a compressor of a forward propulsion engine to provide at the start-up of the lift engine a relatively hot mixture, and thereafter the air supply is from a lift engine compressor to produce a relatively cool mixture.

This invention concerns a bearing lubricating system for an aircraft gas turbine engine.

According to the present invention, there is provided a bearing lubricating system for an aircraft gas turbine engine, said system comprising a lubricant reservoir, at least one lubricant conduit communicating with said reservoir, a venturi, said at least one conduit extending to the throat of the venturi, first and second supply means for producing a supply of relatively hot and relatively cold pressurized air respectively, a duct which communicates with said venturi, valve means for selectively placing said duct into communication with one of said first and second supply means, said duct and said conduit having substantial portions arranged in heat exchange relationship with each other upstream of and immeditely adjacent to said throat, flow of pressurized air through said duct and said throat inducing a flow of lubricant through said conduit and through said throat to produce an air/lubricant mixture, means for passing said mixture to said bearing and means for returning to the reservoir lubricant which has passed through said bearing.

The downstream end of the oil conduit may extend axially of the venturi or at right angles thereto.

The reservoir may be annular and may be arranged concentrically about a shaft which is rotatably mounted in the said bearing.

There may be a plurality of angularly spaced apart oil conduits which communicate with the annular reservoir, each said oil conduit extending to the throat of a said venturi and being in heat exchange relationship with a said gas duct, whereby one or more of the said oil conduits may receive oil from the reservoir even when the latter is tilted.

The invention also comprises a gas turbine engine provided with a bearing as set forth above, the said means for producing a supply of pressurised gas being constituted by a compressor of the engine.

The engine may, for example, be a vertical lift engine, e.g. one having a thrust to weight ratio of at least 8:1 and preferably of at least 16:1.

The term "vertical lift engine," as used in this specification, is intended to indicate an engine adapted to produce vertical lift forces on an aircraft independently of those generated aerodynamically by forward flight of the aircraft.

Additionally, the invention comprises aircraft power plant comprising at least one main forward propulsion engine and at least one vertical lift engine, a bearing lubrication system for a bearing of said lift engine, said system comprising a lubricant reservoir, at least one lubricant conduit communicating with said reservoir, a venturi, said at least one conduit extending to the throat of said venturi, first supply means including a compressor of said main forward propulsion engine for producing a supply of relatively hot pressurized air, second supply means including a compressor of said lift engine for producing a supply of relatively cool pressurized air, a gas duct which communicates with said venturi, valve means for selectively placing said duct into communication with one of said first and second supply means, said duct and said conduit having substantial portions arranged in heat exchange relationship with each other upstream of and immediately adjacent to said throat, flow of pressurized air through said duct and said throat inducing a flow of lubricant through said conduit and through said throat to produce an air/lubricant mixture, means for passing said mixture to said bearing and means for returning to the reservoir lubricant which has passed through said bearing, said valve means placing said first supply means into communication with said duct whenever the supply pressure of said second supply means falls below a predetermined value.

The invention is illustrated, merely by way of example, in the accompanying drawings, in which:

FIGURE 1 is a diagrammatic elevation of a gas turbine vertical lift engine embodying the present invention, FIGURE 2 is a diagrammatic broken-away sectional view showing part of structure of FIGURE 1 on an enlarged scale, and FIGURES 3 and 4 illustrate modifications, FIGURE 3 being a developed view, and FIGURE 5 is a diagrammatic side elevation of an aircraft having a gas turbine vertical lift engine embodying the present invention.

In FIGURE 1 there is shown a gas turbine vertical lift engine 10 which may be one of a bank of said engines which are mounted in an aircraft 6. The aircraft has main propulsion engines 7 having, in axial flow series, compressor means 8, combustion equipment 9, turbine means 19 and an exhaust assembly 20 which are horizontally disposed in the normal flight attitude of the aircraft and the said vertical lift engine may be vertically disposed during the said normal flight attitude thereof.

The lift engine 10, which has a thrust to weight ratio of at least 8:1 and preferably of at least 16:1, has an engine casing 11 within which there are mounted, in flow series, a compressor 12, combustion equipment 13, and a turbine 14, the turbine exhaust gases being directed downwardly to atmosphere through a short exhaust duct 15.

The compressor 12 and turbine 14 are mounted on a vertical shaft 16 which is itself rotatably mounted in an upper (or "front") bearing 17 and a lower (or "rear") bearing 18. The bearing 17 is supported from an inner casing 21 by a plurality of angularly spaced apart hollow struts 22, the inner casing 21 being carried from the engine casing 11 by way of a plurality of angularly spaced apart hollow struts 23.

Mounted beneath and carried by one or more of the struts 22 is an oil reservoir 24. Oil may be introduced into the reservoir 24 by way of a supply pipe (not shown) extending through the struts 22, 23.

Two spaced apart conduits 25, 26 extend into the oil in the reservoir 24, each of the conduits 25, 26 being provided at its inner end with at least one restrictor 27. The conduits 25, 26 are mounted concentrically within and are in heat exchange relationship with ducts 30, 31 respectively. The ducts 30, 31, which are arranged to receive a supply of hot compressed air from a duct 32, extend to venturis 33, 34 and it will be noted that the conduits 25, 26 are in heat exchange relationship with the ducts 30, 31 upstream of and immediately adjacent to the venturis 33, 34.

The conduits 25, 26 extend to the throats of the venturis 33, 34 respectively, whereby the passage of the hot compressed air through the latter will cause the oil to be withdrawn from the reservoir 24 and to pass through the conduits 25, 26 to the throats of the venturis 33, 34 where it will be atomised in the said hot compressed air.

In the arrangement shown in FIGURE 2, the downstream ends of the conduits 25, 26 extend at right angles to the axes of the venturis 33, 34. Alternatively, however, as shown in FIGURE 4, the downstream ends of the conduits 25, 26 could extend axially of the venturis 33, 34.

Hot compressed air which has passed through the venturi 34 and which contains atomised oil is supplied via a passage 35 to the bearing 18 so as to effect lubrication of the latter. Oil which has passed through the bearing 18 is then returned to the reservoir 24 by way of a passage 36.

Hot compressed air which has passed through the venturi 33 and which contains atomised oil is supplied to the bearing 17. Oil which has passed through the bearing 17 is returned to the reservoir 24 by means not shown.

If desired, the oil reservoir may, as shown in FIGURE 3, be constituted by an annular oil reservoir 40 which is arranged concentrically about the shaft 16 and which is provided with a plurality of equi-angularly spaced apart conduits 41, 42, 43. The conduits 41, 42, 43 are mounted concentrically within hot compressed air ducts 44, 45, 46 respectively and communicate with the oil in the reservoir 40 through restrictions 47. The conduits 41–43 extend to the throats of venturis 50, 51, 52 respectively and are in heat exchange relationship with their ducts 44–46.

In the arrangement of FIGURE 3, it will be appreciated that one or more of the conduits 41–43 may receive oil from the reservoir 40 even when the latter is tilted.

The duct 32 communicates with a chamber 53 which itself communicates via duct 54 with the downstream end of the compressor 12. Thus, the duct 54 will receive air which has been heated by being compressed in the compressor 12. A valve member 55 controls flow from the duct 54 to the chamber 53.

The chamber 53 also communicates with a duct 56 which in turn communicates with a duct 57. The duct 57 is arranged to receive air which has been heated by virtue of being compressed in the compressor means 8 of the main propulsion engine 7. Communication between the duct 56 and the chamber 53 is controlled by a valve member 60.

The valve means V including the valve members 55, 60 are resiliently urged apart by a spring 61, having a force such that, when the pressure in the duct 54 exceeds that in the duct 56, the valve member 55 will be open and the valve member 60 will be closed, while when the pressure in the duct 56 exceeds that in the duct 54, the valve member 60 will be open and the valve member 55 will be closed.

The pressures prevailing in the ducts 54, 57 are, in operation, arranged to be such that when the engine 10 is started, the pressure in the duct 57 will exceed that in the duct 54 since the said main propulsion engine 7 will be in full operation at this time. Thus the duct 32 will receive hot air immediately the engine 10 is brought into operation. Once, however, the engine 10 is running at full speed, the pressure in the duct 54 is arranged to exceed that in the duct 57 by valve means V shutting off the supply of compressed air from the compressor 8 and the oil will thereafter be atomised by hot air produced in the engine 10 itself.

Alternatively the duct 54 may receive cooling air from one of the early stages of the compresor 12 of the lift engine 10, while the duct 57 may receive hot air from the starting air supply, namely, the compressor means 8 of engine 7. In this case the arrangement may be such that the said hot air serves to warm the oil which passes into the bearings 17, 18 immediately on start-up. Once the lift engine 10 has been started, however, the starting air supply is shut off and the pressure in the duct 57 decays. The valve 55 will then be opened by the pressure in the duct 54. Thus during the remainder of the running time of the lift engine 10 the air in the ducts 30, 31 can be arranged to cool the oil before the latter flows through the conduits 25, 26.

We claim:
1. A bearing lubricating system for an aircraft gas turbine engine comprising: a lubricant reservoir, at least one lubricant conduit communicating with said reservoir, a venturi having a throat, said at least one conduit extending from said reservoir to the throat of said venturi, first and second supply means for producing a supply of relatively hot and relatively cold pressurized air respectively, a duct communicating with said venturi, valve means for placing said duct into communication with one of said first and second supply means, said duct and said conduit having substantial portions arranged in heat exchange relationship with each other upstream of and immediately adjacent to said throat, flow of pressurized air through said duct and said throat inducing a flow of lubricant through said conduit and through said throat to produce an air/lubricant mixture, a bearing, means for passing said mixture to said bearing, and means for returning to the reservoir lubricant which has passed through said bearing.

2. A bearing lubrication system as claimed in claim 1 in which there are a plurality of angularly spaced apart conduits communicating with said reservoir, each of said conduits extending to the throat of said venturi and being in heat exchange relationship with said duct, whereby at least one of the said conduits may receive oil from the reservoir even when the latter is tilted.

3. Aircraft power plant comprising: at least one main forward propulsion engine and at least one vertical lift engine having a bearing, a bearing lubrication system for the bearing of said lift engine, said system comprising a lubricant reservoir, at least one lubricant conduit communicating with said reservoir, a venturi having a throat, said at least one conduit extending to the throat of said venturi, first supply means including a compressor of said main forward propulsion engine for producing a supply of relatively hot pressurized air, second supply means including a compressor of said lift engine for producing a supply of relatively cool pressurized air, a gas duct communicating with said venturi, valve means for placing said duct into communication with one of said first and second supply means, said duct and said conduit having substantial portions arranged in heat exchange relationship with each other upstream of and immediately adjacent to said throat, flow of pressurized air through said duct and said throat inducing a flow of lubricant through said conduit and through said throat to produce an air/lubricant mixture, means for passing said mixture to said bearing, and means for returning to the reservoir lubricant which has passed through said bearing, said valve means placing said first supply means into communication with said duct whenever the supply pressure of said second supply means falls below a predetermined value.

4. Aircraft power plant as claimed in claim 3 wherein the normal supply pressure of said first supply means is arranged to be greater than the normal supply pressure of said second supply means so that, on start-up of said lift engine, a relatively hot air/lubricant mixture is passed to said bearing, means being provided for shutting off thereafter the first supply means to cause said valve means to place said second supply means into communication with said duct so that a relatively cool air/lubricant mixture is passed to said bearing.

References Cited
UNITED STATES PATENTS

| | | |
|---|---|---|
| 2,740,267 | 4/1956 | Bayard. |
| 2,886,133 | 5/1959 | Mauck et al. ____ 60—39.08 XR |
| 2,986,433 | 5/1961 | Herrmann _____ 308—187 |
| 3,321,910 | 5/1967 | Davies et al. _____ 60—39.08 |

CARLTON R. CROYLE, *Primary Examiner.*